US008649771B1

(12) United States Patent
Faaborg et al.

(10) Patent No.: US 8,649,771 B1
(45) Date of Patent: Feb. 11, 2014

(54) SYSTEM AND METHOD FOR CONTROLLING ACCESS TO A PARTICULAR FUNCTIONALITY OF A WIRELESS COMMUNICATION DEVICE

(71) Applicant: Google Inc., Mountain View, CA (US)

(72) Inventors: Alexander Faaborg, Mountain View, CA (US); Angana Ghosh, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/765,442

(22) Filed: Feb. 12, 2013

Related U.S. Application Data

(60) Provisional application No. 61/719,856, filed on Oct. 29, 2012.

(51) Int. Cl.
*H04M 1/66* (2006.01)

(52) U.S. Cl.
USPC .................. 455/411; 455/414.1; 455/456.1; 455/456.3; 455/456.6; 455/457

(58) Field of Classification Search
None
See application file for complete search history.

(56) References Cited

U.S. PATENT DOCUMENTS

| 8,107,973 | B1* | 1/2012 | Sjothun ...................... 455/456.3 |
| 2009/0013413 | A1* | 1/2009 | Vera et al. ........................ 726/30 |
| 2009/0172412 | A1* | 7/2009 | Fascenda et al. ............. 713/189 |
| 2011/0190009 | A1* | 8/2011 | Gerber et al. .............. 455/456.3 |

* cited by examiner

*Primary Examiner* — Suhail Khan
(74) *Attorney, Agent, or Firm* — McDonnell Boehnen Hulbert & Berghoff LLP

(57) ABSTRACT

Systems and methods for controlling access to a particular functionality of a wireless communication device are described. For example, a device can include a memory and a processor that is operatively coupled to the memory. The processor can be configured to display a list of entities that have applications installed on the device that can access a particular functionality of the device; display, for each entity, a complete list of applications associated with the corresponding entity and installed on the device, wherein each of the listed applications can access the particular functionality of the device; and provide a respective graphical switch for each entity and by which access is denied to the particular functionality of the device to all of the listed applications associated with the corresponding entity.

20 Claims, 3 Drawing Sheets

SYSTEM AND METHOD FOR CONTROLLING ACCESS TO A PARTICULAR FUNCTIONALITY OF A WIRELESS COMMUNICATION DEVICE

CROSS-REFERENCE TO RELATED APPLICATIONS/INCORPORATION BY REFERENCE

This patent application makes reference to, claims priority to and claims benefit from U.S. Provisional Application Ser. No. 61/719,856 filed on Oct. 29, 2012. The above stated application is hereby incorporated herein by reference in its entirety.

BACKGROUND

A mobile wireless device allows a user to control if location determining hardware and software running on the mobile wireless device is enabled or disabled for the mobile wireless device as a whole.

A particular application on a mobile device can seek permission from the user during installation on the mobile wireless device to access the location determining hardware and software running on the mobile wireless device. If the user does not want the particular application to access the location determining hardware and software, then the user can abort the installation.

An operating system might be able to block access for a particular application installed on the mobile wireless device to the location determining hardware and software running on the mobile wireless device; however, the operating system cannot block access to location determining hardware and software with respect to an organization (e.g., an entity, a developer, etc.) that has created many different applications.

Further limitations and disadvantages of conventional and traditional approaches will become apparent to one of skill in the art through the comparison of such systems with some aspects of some embodiments according to the present disclosure as set forth in the remainder of the present application with reference to the drawings.

BRIEF SUMMARY

Aspects of the disclosure relate to methods and systems for controlling access to a particular functionality of a wireless communication device.

An example embodiment provides a mobile device including, for example, one or more memories and one or more processors that are operatively coupled to the one or more memories. The one or more processors can be configured to display a list of entities that have applications installed on the device that can access a particular functionality of the device related to accessing a location of the device; display, for each entity, a list of applications associated with the corresponding entity and installed on the device, wherein each of the listed applications can access the particular functionality of the device; and provide a respective graphical switch for each entity by which access is denied to the particular functionality of the device to all of the listed applications associated with the corresponding entity.

An example embodiment provides a method including, for example, one or more of the following: displaying, by one or more processors on a wireless communication device, a list of entities that have applications installed on the wireless communication device that can access a particular functionality of the device; displaying, by the one or more processors, for each entity, a list of applications associated with the corresponding entity and installed on the wireless communication device, wherein each of the listed applications can access the particular functionality of the wireless communication device; providing, by the one or more processors, a respective graphical switch for each entity by which access is denied to the particular functionality of the wireless communication device to all of the listed applications associated with the corresponding entity; and denying access, by the one or more processors, to all of the listed applications associated with the corresponding entity based on a status of the respective graphical switch An example embodiment provides a method including, for example, one or more of the following: associating, by an operating system running on one or more processors of a wireless communication device, all of the applications installed on the wireless communication device according to the particular entity that developed the applications; displaying, by the operating system, a list of entities that have applications installed on the wireless communication device that can access a particular functionality of the device; displaying, by the operating system, for each entity, a list of applications associated with the corresponding entity and installed on the wireless communication device, wherein each of the listed applications can access the particular functionality of the wireless communication device; providing, by the operating system, a respective graphical switch for each entity by which access is denied to the particular functionality of the wireless communication device to all of the listed applications associated with the corresponding entity; and denying access, by the operating system, to all of the listed applications associated with the corresponding entity based on a status of the respective graphical switch.

These and other advantages, aspects and novel features of the present disclosure, as well as details of an illustrated embodiment thereof, will be more fully understood from the following description and drawings.

DETAILED DESCRIPTION

Aspects of the disclosure relate to methods and systems for controlling access to a particular functionality, which can include hardware and/or software, of a wireless communication device.

Figure 1:
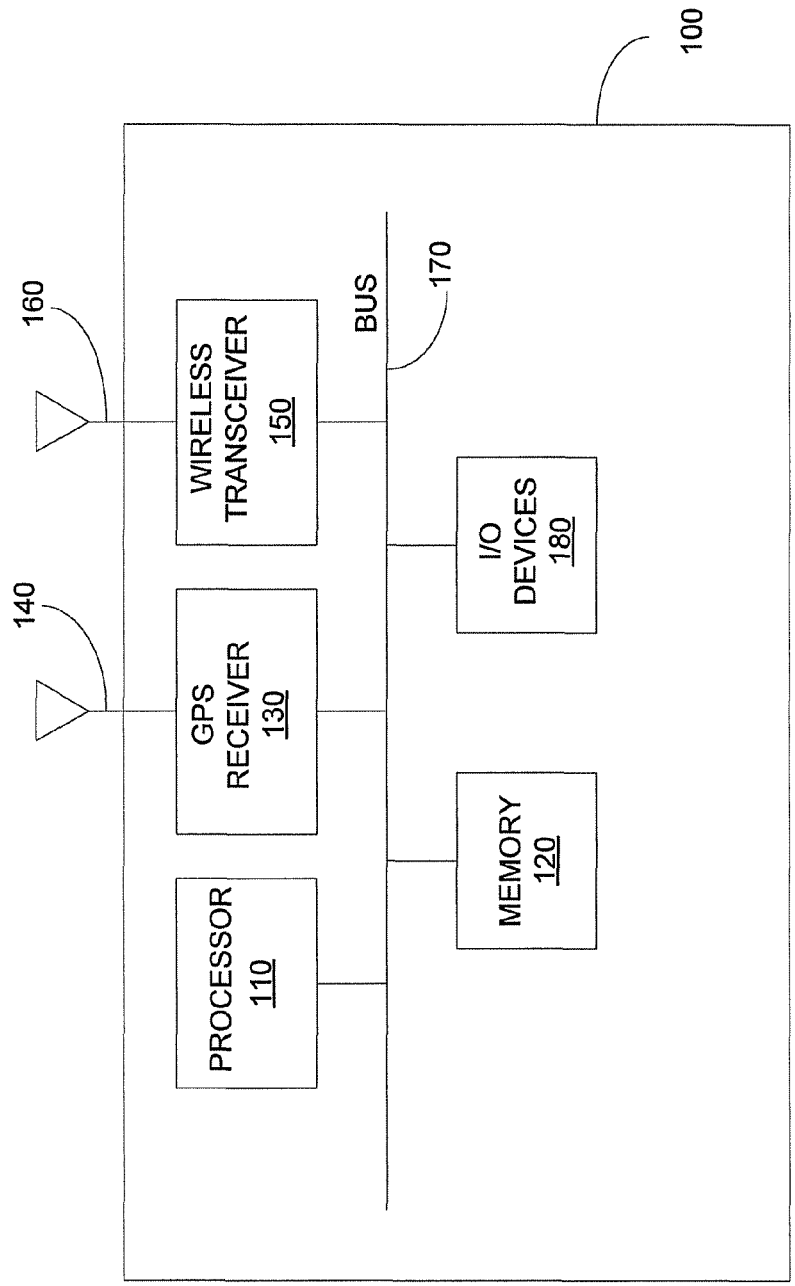
FIG. 1 shows an example embodiment of a wireless communication device.

FIG. 1 illustrates an example embodiment of a wireless communication device. The wireless communication device 100 can include, for example, one or more processors 110, one or more memories 120, a global positioning system (GPS) receiver 130, a GPS antenna 140, one or more wireless transceivers 150, one or more antennas 160, one or more buses 170 and one or more input/output (I/O) devices 180.

Referring to FIG. 1, the processor 110, the memory 120, the GPS receiver 130, the wireless transceiver 150 and the other I/O devices 180 are coupled to the bus 170. The memory can include, for example, ROM, RAM, flash memory, memory card, non-transitory computer readable media, and other types of storage. An operating system, which can include, for example, instructions, code and/or software can be stored, at least in part, in the memory 120 and can be run on or executed by the processor 110. In an example embodiment, the processor 110 can have one or more internal memories (e.g., cache memories, non-transitory computer readable media, etc.) in which can reside at least a portion of the operating system to be run on or executed by the processor 110.

In an example embodiment, the GPS receiver 130 is coupled to the GPS antenna 140 to receive GPS signals. The GPS system is but one example of a location determining system that can be used to determine a location of the wireless communication device 100. The wireless communication device 100 can also use the wireless transceiver 150, which is coupled to the antenna 160, to determine a location of the wireless communication device 100 by using information received from the cellular signals or wireless local area networks (WLAN) as is known in the art. In an example embodiment, the location determining system uses GPS and/or cellular/WLAN techniques to determine a position of the wireless communication device 100.

Although illustrated as one wireless transceiver 150 and one antenna 160, an example embodiment can have a plurality of wireless transceivers 150 with each wireless transceiver 150 having one or more antennas 160 coupled to the respective transceiver 150. For example, the wireless transceiver 150 can include a first wireless transceiver for use with a cellular communication system (e.g., a cellular phone communication system) and can include a second wireless transceiver for use with a Bluetooth communication system or an IEEE 802.11a, b, g or n communication system. In the case, for example, of the IEEE 802.11n communication system, the second wireless transceiver can be coupled to a plurality of antennas. In addition, some cellular mobile communication systems use multiple antennas such as, for example, in a multiple input multiple output (MIMO) communication system.

The I/O devices 180 can include, for example, one or more of the following: a display, a touch-sensitive display, a camera, a keyboard, a speaker, a microphone, keys, buttons, indicator lights, graphical user interface, etc.

In operation, the operating system is stored on the memory 120 and/or an internal memory of the processor 110 and is run on or executed by the processor 110. In part, the operating system can control access to various functionalities of the wireless communication device 100 by applications that have been installed on the wireless communication device 100.

In an example embodiment, the operating system can cluster applications together based on the company that created them by inspecting their cryptographic signature, by inspecting the applications that have been uploaded to an online store using the same account, or by other means.

In an example embodiment, the operating system can provide a user with the ability to provide access or to deny access to one or more functionalities of the wireless communication device 100 for all of the applications of a particular organization that have been installed on the wireless communication device 100. For example, all of the applications of Company A can be denied access to location determining mechanisms of the wireless communication device 100. This may include, for example, hardware and/or software of the wireless communication device 100 that would be used to determine the location of the wireless communication device 100. Thus, for example, the operating system can deny access to the GPS receiver 130, the GPS antenna 140 and any GPS software for all of the applications of Company A that are installed on the wireless communication device.

The ability to control access to, for example, the location determining mechanisms of the wireless communication device 100 can be achieved by turning on or off a switch (e.g., a graphical switch) that corresponds to Company A. In an example embodiment, a single switch can provide or deny access to the location determining mechanisms of the wireless communication device 100 for all of the applications of Company A that are installed on the wireless communication device 100.

In an example embodiment in which the location determining mechanisms include the wireless transceiver 150 and the antenna 160, the processor 110 running or executing the operating system can provide or deny access to all of the location determining mechanisms including, for example, the wireless transceiver 150, the antenna 160 and/or location determining software for all of the applications of Company A installed on the wireless communication device 100.

In an example embodiment, the operating system can provide or deny access to one or more of the I/O devices 180 of the wireless communication device 100 for all of the applications of a particular organization, for example, Company A. Thus, for example, the operating system can provide or deny access to camera hardware and/or software of the wireless communication device 100 for all of the applications (e.g., games, messenger services, social media applications, etc.) of a particular company, for example, Company A.

In an example embodiment, the operating system can provide or deny access to a microphone, a speaker, recording hardware and/or software, and other functionalities, which includes hardware and/or software, provided by the wireless communication device 100 for all of the applications for selected organizations (e.g., entities, developers, companies, merchants, etc.). Each selected organization can have a single graphical switch that can provide or deny access to a particular functionality of the wireless communication device 100 for all of the respective applications of the corresponding organization that are installed on the wireless communication device 100.

Figure 2:
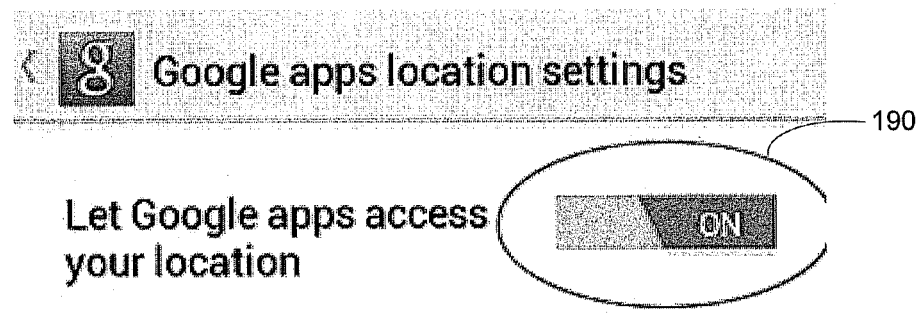
FIG. 2 shows an example embodiment of a control display on the wireless communication device.

FIG. 2 shows an example embodiment of a control display provided by the operating system illustrating a switch 190 (e.g., a graphical switch). In an example embodiment, a single master switch 190 provides a centralized settings panel to block access to location determining systems of the wireless communication device 100 for all Google applications, for example. Non-Google applications are not affected by the single master switch 190.

In an example embodiment, a single graphical switch 190 is used for each company in which each company can have a plurality of applications installed on the wireless communication device 100. The user can flip the switch 190 between on or off. This can be achieved, for example, by pressing a touch sensitive screen, moving a cursor, or pressing a keyboard key or a button. In the on position, the operating system provides all applications by Google, for example, that are installed on the wireless communication device 100 access to the location determining system of the wireless communication device 100 to determine a location of the wireless communication device 100.

By using a single graphical switch 190, a user can be sure that, if the user does not want Company A to receive location information from the wireless communication device 100, for example, the user can deny access to all of the applications of Company A that are installed in the wireless communication device 100. If the user had to manually look up each application and turn of a corresponding switch for each application, the user might miss one of the applications. Thus, Company A will still obtain location information from the wireless communication device 100 even if all but one of the applications of Company A installed on the wireless communication device 100 are denied access to the location determining system of the wireless communication device 100. In addition, determining access application by application can be inefficient and tedious in accordance with an example embodiment.

Although illustrated at times as denying access to a particular functionality such as, for example, the location determining system of the wireless communication device 100, the operating system can merely provide no data, override data or provide default data instead of denying access to the location determining system. In an example embodiment, the operating system spoofs access to the location determining system when the graphical switch is set to off. In an example embodiment, instead of or in addition to denying access to the GPS receiver 130 and the GPS antenna 140, the operating system can provide no data, or override actual data received from the GPS receiver 130 and the GPS antenna 140, or provide default data, which does not reflect real-time location, instead of the actual data received from the from the GPS receiver 130 and the GPS antenna.

Figure 3:
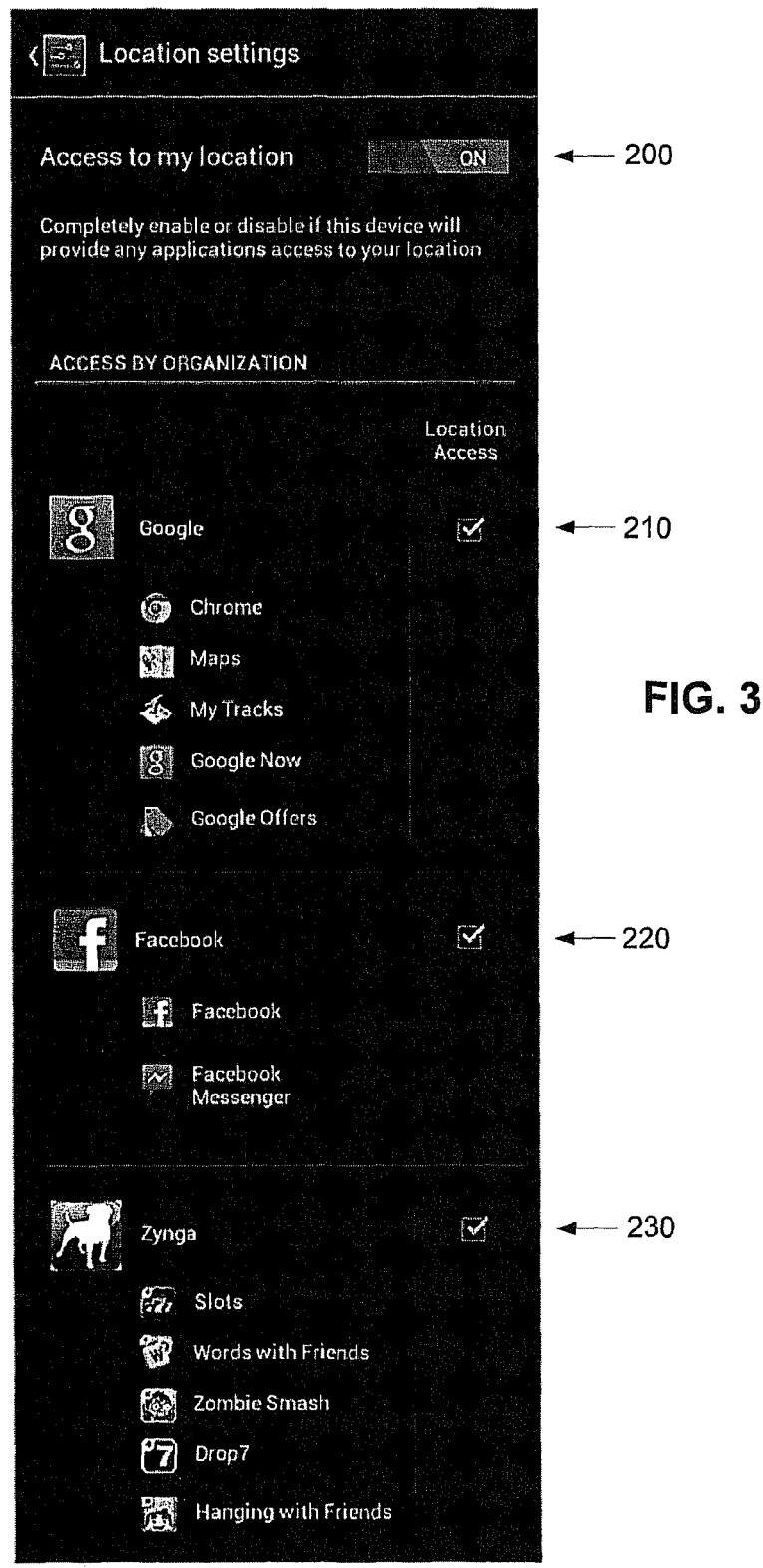
FIG. 3 shows an example embodiment of a control display on the wireless communication device.

FIG. 3 is another example embodiment of a control display of the wireless communication device 100. The control display (e.g., a control panel, settings control, etc.) shows a switch 200 by which the operating system can provide or deny access to a particular functionality of the wireless communication device 100. Referring to FIG. 3, the switch 200 controls access to the location determining system (e.g., hardware and/or software) of the wireless communication device 100 for all the applications installed on the wireless communication device 100.

The operating system also provides switches 210, 220, 230 that control access (e.g., provide access, deny access, enable or disable particular functionalities of the wireless communication device 100) by organization. FIG. 3 shows a list of organizations that have applications installed on the wireless communication device 100 that are capable of accessing or request access to the location determining system of the wireless communication device 100. The partial list of organizations illustrated in FIG. 3 includes the organizations of Google, Facebook and Zynga. In an example embodiment, the applications are organized by their organization. Thus, under each listed organization is a list of all of the applications of the particular organization that are installed on the wireless communication device 100 and that are capable of accessing or request access to the location determining system of the wireless communication device 100.

For example, the status of the switch 230 determines whether all the applications by game developer, Zynga, can have access to the location determining system of the wireless communication device 100 to determine a location of the wireless communication device 100 and possibly report the location to Zynga. In the display, under the game developer, Zynga, is a complete list of all the applications (e.g., games) installed on the wireless communication device 100 that are capable of accessing or request access to the location determining system of the wireless communication device 100.

In an example embodiment, the operating system can also provide control panels as shown in FIG. 3, but for other functionalities of the wireless communication device 100 such as, for example, access to the camera, the microphone, the speaker, etc.

In an example embodiment, status of the switches 200, 210, 220, 230 are reflected in one or more flags that an application has to analyze or inspect before the application can access the location determining system of the wireless communication device 100.

In an example embodiment, the operating system organizes the applications in groups according to organization and the functionalities of the wireless communication device 100 that the applications are capable of accessing or request to access.

In an example embodiment, the operating system analyzes a signature of an application to determine with which organization the application is associated. For example, a developer can have a particular private key that is used to sign the application that the developer creates, for example. The operating system can analyze the signature on the application and determine the particular developer and associate the application with the particular developer.

In an example embodiment, applications can be downloaded from a particular application distribution service (e.g., Google Play) to the wireless communication device 100 for installation. The organizations that, for example, create, develop or sell the applications have accounts with the particular application distribution service. Thus, when an application is downloaded from the particular application distribution service, the application is downloaded under the account of the organization. It is the account information that operating system uses to identify the organization with which the application is to be associated. In an example embodiment, each organization has one account.

In an example embodiment, the operating system that is configured in accordance with a permission model can be configured to provide the granular controls over permissions as described herein.

In an example embodiment, the operating system is configured to provide privacy controls and/or to create and to support privacy controls.

Systems, devices and methods for controlling access to a particular functionality, which can include hardware and/or software, of a wireless communication device are described. For example, a wireless communication device can include a memory and a processor that is operatively coupled to the memory. The processor can be configured to display a list of entities that have applications installed on the wireless communication device that can access a particular functionality of the device. The processor can be configured to display, for each entity, a list of applications associated with the corresponding entity and installed on the wireless communication device, wherein each of the listed applications can access the particular functionality of the device. The processor can also be configured to provide a respective graphical switch for each entity by which access is denied to the particular functionality of the wireless communication device to all of the listed applications associated with the corresponding entity.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to city, ZIP code, or state level), so that a particular user location of a user cannot be determined. Thus, the user may have control over how information is collected about the user and used by a content server.

While the present method and apparatus has been described with reference to certain embodiments, it will be understood by those skilled in the art that various changes may be made and equivalents may be substituted without departing from the scope of the present method and apparatus. In addition, many modifications may be made to adapt a particular situation or material to the teachings of the present disclosure without departing from its scope. Therefore, it is intended that the present method and apparatus not be limited to the particular embodiment disclosed, but that the present method and apparatus will include all embodiments falling within the scope of the appended claims.

What is claimed is:

1. A mobile device, comprising:
   one or more memories; and
   one or more processors operatively coupled to the one or more memories, wherein the one or more processors are configured to:
   provide for display a list of entities that have applications installed on the device that can access a particular functionality of the device related to accessing a location of the device,
   provide for display, with each entity of the list of entities, a respective list of applications installed on the device and associated with the entity, wherein each application of the respective list of applications can access the particular functionality of the device, and
   provide a respective graphical switch for each entity of the list of entities, wherein access to the particular functionality of the device for all applications of the respective list of applications associated with the entity is configured based on a state of the respective graphical switch.

2. The device according to claim 1, wherein the particular functionality of the device is determining the location of the device.

3. The device according to claim 1, wherein the particular functionality of the device is using an antenna to send or receive information.

4. The device according to claim 1, wherein the particular functionality of the device is using a wireless receiver to receive information.

5. The device according to claim 1, wherein the respective graphical switch is a respective graphical box that can be checked and unchecked.

6. The device according to claim 5, wherein the checking or unchecking of the respective graphical box determines whether all applications of the respective list of applications associated with the entity are denied access to the particular functionality.

7. The device according to claim 1, wherein the processor is configured to run an operating system that displays the list of entities; displays, with each entity, the complete respective list of applications associated with the entity; and provides a respective graphical switch for each entity of the list of entities.

8. The device according to claim 1, wherein the processor is configured to group all of the applications installed on the device according to a particular entity that developed the applications.

9. The device according to claim 1, wherein the processor is configured to analyze a respective signature used with each respective application installed on the device, wherein the signature identifies a particular entity with which the respective application is associated.

10. The device according to claim 1, wherein the processor is configured to associate a particular application with an entity by analyzing a signature used with the particular application.

11. The device according to claim 1, wherein the processor is configured to associate a particular application with an entity by analyzing a key used with the particular application, wherein the key belongs to the entity.

12. The device according to claim 1, wherein the processor is configured to associate a particular application with an entity by determining an account under which the particular application was downloaded.

13. The device according to claim 1, wherein the respective graphical switch for each entity of the list of entities is under the control of an operating system that runs on the processor.

14. The device according to claim 1, wherein the respective graphical switch for a particular entity of the list of entities is not under the control of one of the applications associated with the particular entity.

15. The device according to claim 5, wherein the checking or unchecking of the respective graphical box, which is under the control of an operating system that runs on the processor, determines whether access to the particular functionality of the device for all applications of the respective list of applications associated with an entity of the list of entities is allowed based on a state of the respective graphical switch.

16. The device according to claim 1, wherein the memory and the processor are part of one or more of the following: a cellular device, a cellular phone, a smart phone, a computing tablet, a laptop computer, a computer, and a wireless communication device.

17. A method, comprising:
   providing for display, by one or more processors on a wireless communication device, a list of entities that have applications installed on the wireless communication device that can access a particular functionality of the wireless communication device;
   providing for display, by the one or more processors, with each entity of the list of entities, a respective list of applications installed on the wireless communication device and associated with the entity, wherein each application of the respective list of applications can access the particular functionality of the wireless communication device;
   providing, by the one or more processors, a respective graphical switch for each entity of the list of entities, wherein access to the particular functionality of the wireless communication device for all applications of the respective list of applications associated with the entity is configured based on a state of the respective graphical switch; and
   denying access, by the one or more processors, to all applications of the respective list of applications associated with the entity based on the state of the respective graphical switch.

18. The method according to claim 17, wherein the wireless communication device includes one or more of the following: a cellular device, a cellular phone, a smart phone, a computing tablet, a laptop computer, a computer, a handheld wireless device and a mobile phone.

19. The method according to claim 17, wherein the particular functionality of the wireless communication device includes one or more of the following: determining a location of the wireless communication device, using an antenna to send or receive information, and using a wireless receiver to receive data.

20. A method, comprising:
associating, by an operating system running on one or more processors of a wireless communication device, all applications installed on the wireless communication device according to a particular entity that developed the applications;
providing for display, by the operating system, a list of entities that have applications installed on the wireless communication device that can access a particular functionality of the device;
providing for display, by the operating system, with each entity of the list of entities, a respective list of applications installed on the wireless communication device and associated with the entity, wherein each application of the respective list of applications can access the particular functionality of the wireless communication device;
providing, by the operating system, a respective graphical switch for each entity of the list of entities, wherein access to the particular functionality of the wireless communication device for all applications of the respective list of applications associated with the entity is configured based on a state of the respective graphical switch; and
denying access, by the operating system, to all applications of the respective list of applications associated with the entity based on the state of the respective graphical switch.

* * * * *